US012252665B2

(12) United States Patent
Nad et al.

(10) Patent No.: US 12,252,665 B2
(45) Date of Patent: Mar. 18, 2025

(54) AQUEOUS LIQUID HAND DISHWASHING DETERGENT FORMULATION

(71) Applicant: Dow Silicones Corporation, Midland, MI (US)

(72) Inventors: Saugata Nad, Brussels (BE); Serge Creutz, Liege (BE); Christel Simon, Lobbes (BE)

(73) Assignee: Dow Silicones Corporation, Midland, MI (US)

( * ) Notice: Subject to any disclaimer, the term of this patent is extended or adjusted under 35 U.S.C. 154(b) by 461 days.

(21) Appl. No.: 17/637,649

(22) PCT Filed: Oct. 14, 2020

(86) PCT No.: PCT/US2020/055446

§ 371 (c)(1),
(2) Date: Feb. 23, 2022

(87) PCT Pub. No.: WO2021/072411

PCT Pub. Date: Apr. 15, 2021

(65) Prior Publication Data

US 2022/0275308 A1 Sep. 1, 2022

Related U.S. Application Data

(60) Provisional application No. 62/912,285, filed on Oct. 8, 2019.

(51) Int. Cl.

| | |
|---|---|
| ***C11D 1/00*** | (2006.01) |
| ***B08B 3/04*** | (2006.01) |
| ***C11D 1/29*** | (2006.01) |
| ***C11D 1/66*** | (2006.01) |
| ***C11D 1/831*** | (2006.01) |
| ***C11D 1/88*** | (2006.01) |
| ***C11D 3/00*** | (2006.01) |
| ***C11D 3/22*** | (2006.01) |
| ***C11D 3/37*** | (2006.01) |
| ***C11D 11/00*** | (2006.01) |
| ***C11D 17/00*** | (2006.01) |

(52) U.S. Cl.

CPC ................ *C11D 1/29* (2013.01); *C11D 1/831* (2013.01); *C11D 3/0094* (2013.01); *C11D 3/3707* (2013.01); *C11D 3/3765* (2013.01); *C11D 3/378* (2013.01); *C11D 17/0008* (2013.01); *C11D 3/0047* (2013.01); *C11D 2111/18* (2024.01)

(58) Field of Classification Search

CPC .... C11D 1/00; C11D 1/29; C11D 1/66; C11D 1/662; C11D 1/88; C11D 3/22; C11D 3/3707; C11D 3/3746; C11D 3/3765; C11D 3/378; C11D 11/00; B08B 3/04

See application file for complete search history.

(56) References Cited

U.S. PATENT DOCUMENTS

| | | | |
|---|---|---|---|
| 5,424,010 | A | 6/1995 | Duliba et al. |
| 6,825,157 | B2 | 11/2004 | Sivik et al. |
| 6,827,795 | B1 | 12/2004 | Kasturi et al. |
| 7,214,650 | B2 | 5/2007 | Kasturi et al. |
| 7,718,595 | B2 | 5/2010 | Murphy et al. |
| 8,784,571 | B2 | 7/2014 | Schutz et al. |
| 2002/0169097 | A1 | 11/2002 | Kasturi et al. |
| 2009/0023625 | A1 | 1/2009 | Tang et al. |
| 2010/0197550 | A1 | 8/2010 | Bettiol et al. |
| 2010/0197553 | A1 | 8/2010 | Barnabas et al. |
| 2013/0072416 | A1 | 3/2013 | Price et al. |
| 2015/0267150 | A1 | 9/2015 | Chen et al. |

FOREIGN PATENT DOCUMENTS

| | | | | |
|---|---|---|---|---|
| EP | 2395072 | A1 | 12/2011 | |
| WO | 2019045958 | A1 | 3/2019 | |
| WO | 2019108198 | A1 | 6/2019 | |
| WO | WO 2019/108198 | * | 6/2019 | ............... C11D 1/65 |

OTHER PUBLICATIONS

Rohm and Haas, Acusol 445/445N/445ND Product Literature, pp. 1-5, Jul. 2006.*

* cited by examiner

*Primary Examiner* — Brian P Mruk
(74) *Attorney, Agent, or Firm* — Thomas S. Deibert

(57) ABSTRACT

Aqueous liquid hand dishwashing detergent formulation, is provided including water; an anionic surfactant; and a suds enhancing additive, wherein the suds enhancing additive is a polyacrylic acid homopolymer having a molecular weight of 1,000 to 7,500 Daltons.

16 Claims, No Drawings

AQUEOUS LIQUID HAND DISHWASHING DETERGENT FORMULATION

The present invention relates to an aqueous liquid hand dishwashing detergent formulation. In particular, the present invention relates to an aqueous liquid hand dishwashing detergent formulation including water; an anionic surfactant; and a suds enhancing additive, wherein the suds enhancing additive comprises a polyacrylic acid homopolymer having a molecular weight of 1,000 to 7,500 Daltons.

The best surfactants for liquid hand dishwashing detergent formulations tend to irritate the skin of some users. More mild surfactants, however, tend to negatively impact suds mileage which has long been a recognized signal for the continued effectiveness of the detergent formulation in use.

Duliba et al. provide a liquid detergent formulation in U.S. Pat. No. 5,424,010 Duliba et al disclose a light duty, liquid hand washing composition which is mile, stable foaming composition especially effective in cleaning dishware, glasses, flatware, pots, pans, and delicate clothing by hand at ambient wash water temperature, as well as at warm or hot wash water temperatures. The composition comprises from about 20% to about 40% by weight of at least one anionic or nonionic surfactant; from about 0.5 to about 3.5% by weight of an alcohol which is 3-methyl-3-methoxy-butanol; from about 2% to about 8% of at least one hydrotrope; and from about 50% to about 70% water. The composition has a pH in the range of from about 6.0 to about 8.0 and a viscosity in the range of from about 100 cps to about 500 cps.

Notwithstanding, there remains a continuing need for effective aqueous liquid hand dishwashing detergent formulations having maintained suds mileage and improved aesthetic characteristics (particularly hand feel).

The present invention provides an aqueous liquid hand dishwashing detergent formulation, comprising: water; an anionic surfactant; and a suds enhancing additive, wherein the suds enhancing additive is a polyacrylic acid homopolymer having a molecular weight of 1,000 to 7,500 Daltons.

The present invention provides an aqueous liquid hand dishwashing detergent formulation, comprising: water; an anionic surfactant; and a suds enhancing additive, wherein the suds enhancing additive is a polyacrylic acid homopolymer having a molecular weight of 1,000 to 7,500 Daltons; and wherein the aqueous liquid hand dishwashing detergent formulation contains <0.1 wt % of nitrogen containing polycarboxylates.

The present invention provides an aqueous liquid hand dishwashing detergent formulation, comprising: water; an anionic surfactant; and a suds enhancing additive, wherein the suds enhancing additive is a blend of a polyacrylic acid homopolymer having a molecular weight of 1,000 to 7,500 Daltons and a nonionic surfactant.

The present invention provides an aqueous liquid hand dishwashing detergent formulation, comprising: water; an anionic surfactant; and a suds enhancing additive, wherein the suds enhancing additive is a blend of a polyacrylic acid homopolymer having a molecular weight of 1,000 to 7,500 Daltons, a nonionic surfactant and a sulfonated polymer; wherein the sulfonated polymer has a weight average molecular weight of 1,000 to 25,000 Daltons.

The present invention provides a method of making an aqueous liquid hand dishwashing detergent formulation, comprising: (a) providing water; (b) providing an anionic surfactant; (c) selecting a suds enhancing additive, wherein the suds enhancing additive is selected to include a polyacrylic acid homopolymer, wherein the polyacrylic acid homopolymer has a molecular weight of 1,000 to 7,500 Daltons; (d) providing the suds enhancing additive; (e) combining the water, the anionic surfactant and the suds enhancing additive to form an aqueous liquid hand dishwashing detergent formulation; wherein the concentration of anionic surfactant required to achieve a given suds mileage performance is reduced by at least 30% through the incorporation of the suds enhancing agent.

The present invention provides a method of manually washing an article, comprising: providing an article, wherein the article is selected from the group consisting of at least one of dishware, glassware, flatware, pots and pans; providing an aqueous liquid hand dishwashing detergent formulation of the present invention; manually contacting the article with the aqueous liquid hand dishwashing detergent formulation; and rinsing the aqueous liquid hand dishwashing detergent formulation from the article.

DETAILED DESCRIPTION

The aqueous liquid hand dishwashing detergent formulations of the present invention provide effective cleaning performance with enhanced suds mileage in the presence of greasy food soils while enabling a significant reduction in the amount of anionic cleaning surfactant required to maintain suds mileage with significant improvement in aesthetic characteristics, particularly hand feel.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polyethylene glycol standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

The term "structural units" as used herein and in the appended claims refers to the remnant of the indicated monomer; thus a structural unit of acrylic acid is illustrated:

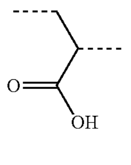

where the dotted lines represent the points of attachment to the polymer backbone.

The term "aesthetic characteristics" as used herein and in the appended claims in reference to an acidic aqueous cleansing formulation refers to visual and tactile sensory properties (e.g., smoothness, tack, lubricity, texture, color, clarity, turbidity, uniformity).

Preferably, the aqueous liquid hand dishwashing detergent formulation of the present invention, comprises: water (preferably, 10 to 99 wt % (more preferably, 25 to 98 wt %;

most preferably, 50 to 97 wt %), based on the weight of the aqueous liquid hand dishwashing detergent formulation, of the water); an anionic surfactant (preferably, 0.01 to 35 wt % (more preferably, 0.1 to 20 wt %; still more preferably, 5 to 12 wt %; most preferably, 8 to <10 wt %), based on the weight of the aqueous liquid hand dishwashing detergent formulation, of the anionic surfactant); and a suds enhancing additive (preferably, 0.1 to 10 wt %; more preferably, 0.2 to 7.5 wt %; still more preferably, 0.4 to 5 wt %; most preferably, 0.5 to 2.5 wt %), based on weight of the aqueous liquid hand dishwashing detergent formulation, of the sud enhancing additive), wherein the suds enhancing additive comprises a polyacrylic acid homopolymer having a molecular weight of 1,000 to 7,500 Daltons (preferably, 1,500 to 6,000 Daltons; more preferably, 4,000 to 5,000 Daltons; most preferably, 4,250 to 4,750 Daltons) (preferably, wherein the suds enhancing additive comprises a blend of the polyacrylic acid homopolymer and a non-ionic surfactant; more preferably, wherein the suds enhancing additive comprises a blend of a polyacrylic acid homopolymer, a non-ionic surfactant and a sulfonated surfactant).

Preferably, the aqueous liquid hand dishwashing detergent formulation of the present invention, comprises: 10 to 99 wt % (preferably, 25 to 98 wt %; more preferably, 50 to 97 wt %), based on the weight of the aqueous liquid hand dishwashing detergent formulation, of the water. Preferable, the aqueous liquid hand dishwashing detergent formulation of the present invention, comprises 10 to 99 wt % (preferably, 25 to 98 wt %; more preferably, 50 to 97 wt %), based on the weight of the aqueous liquid hand dishwashing detergent formulation, of the water; wherein the water is at least one of distilled water, deionized water and industrial soft water. More preferably, the aqueous liquid hand dishwashing detergent formulation of the present invention, comprises 10 to 99 wt % (preferably, 25 to 98 wt %; more preferably, 50 to 97 wt %), based on the weight of the aqueous liquid hand dishwashing detergent formulation, of the water; wherein the water is distilled and deionized. Most preferably, the aqueous liquid hand dishwashing detergent formulation of the present invention, comprises 10 to 99 wt % (preferably, 25 to 98 wt %; more preferably, 50 to 97 wt %), based on the weight of the aqueous liquid hand dishwashing detergent formulation, of the water; wherein the water is distilled, deionized and industrial soft to avoid introduction of undesirable metal ions to the aqueous liquid hand dishwashing detergent formulation.

Preferably, the aqueous liquid hand dishwashing detergent formulation of the present invention, comprises: (preferably, 0.01 to 35 wt % (more preferably, 0.1 to 20 wt %; still more preferably, 1 to 15 wt %; most preferably, 5 to 12 wt %), based on the weight of the aqueous liquid hand dishwashing detergent formulation, of an anionic surfactant. More preferably, the aqueous liquid hand dishwashing detergent formulation of the present invention, comprises: (preferably, 0.01 to 35 wt % (more preferably, 0.1 to 20 wt %; still more preferably, 1 to 15 wt %; most preferably, 5 to 12 wt %), based on the weight of the aqueous liquid hand dishwashing detergent formulation, of an anionic surfactant; wherein the anionic surfactant is selected from the group consisting of alkyl sulfonic acids, alkyl sulfates, alkyl sulfonates, alkyl benzene sulfonic acid, alkyl benzene sulfates, alkyl benzene sulfonates, alkyl ether sulfonic acids, alkyl ether sulfates, alkyl ether sulfonates, paraffin sulfonic acids, paraffin sulfates, paraffin sulfonates, olefin sulfonic acids, olefin sulfates, olefin sulfonates, alpha-sulfocarboxylates, esters of alpha-sulfocarboxylates, alkyl glyceryl ether sulfonic acids, alkyl glyceryl ether sulfates, alkyl glyceryl ether sulfonates, sulfates of fatty acids, sulfonates of fatty acids, sulfonates of fatty acid esters, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, salts thereof and mixtures thereof. Still more preferably, the aqueous liquid hand dishwashing detergent formulation of the present invention, comprises: (preferably, 0.01 to 35 wt % (more preferably, 0.1 to 20 wt %; still more preferably, 1 to 15 wt %; most preferably, 5 to 12 wt %), based on the weight of the aqueous liquid hand dishwashing detergent formulation, of an anionic surfactant; wherein the anionic surfactant is selected from the group consisting of $C_{8-20}$ alkyl benzene sulfonic acid, $C_{8-20}$ alkyl benzene sulfates, $C_{8-20}$ alkyl benzene sulfonate, $C_{8-20}$ alkyl ether sulfonic acids, $C_{8-20}$ alkyl ether sulfates, $C_{8-20}$ alkyl ether sulfonates, paraffin sulfonic acid, paraffin sulfates, paraffin sulfonate, alpha-olefin sulfonic acid, alpha-olefin sulfate, alpha-olefin sulfonate, sulfonates of fatty acids, sulfonates of fatty acid esters, salts thereof and mixtures thereof. Yet still more preferably, the aqueous liquid hand dishwashing detergent formulation of the present invention, comprises: (preferably, 0.01 to 35 wt % (more preferably, 0.1 to 20 wt %; still more preferably, 1 to 15 wt %; most preferably, 5 to 12 wt %), based on the weight of the aqueous liquid hand dishwashing detergent formulation, of an anionic surfactant; wherein the anionic surfactant is selected from the group consisting of $C_{11-13}$ alkyl benzene sulfonic acid, $C_{11-13}$ alkyl benzene sulfonate, $C_{11-13}$ alkyl polyethoxy sulfonic acids, $C_{11-13}$ alkyl polyethoxy sulfates, $C_{11-13}$ alkyl polyethoxy sulfonates, salts thereof and mixtures thereof. Even more preferably, the aqueous liquid hand dishwashing detergent formulation of the present invention, comprises: (preferably, 0.01 to 35 wt % (more preferably, 0.1 to 20 wt %; still more preferably, 1 to 15 wt %; most preferably, 5 to 12 wt %), based on the weight of the aqueous liquid hand dishwashing detergent formulation, of an anionic surfactant; wherein the anionic surfactant is selected from the group consisting of $C_{10-16}$ alkyl benzene sulfonic acid, $C_{10-16}$ alkyl benzene sulfonate, $C_{10-16}$ alkyl polyethoxy sulfonic acids, $C_{10-16}$ alkyl polyethoxy sulfates, $C_{10-16}$ alkyl polyethoxy sulfonates, salts thereof and mixtures thereof. Most preferably, the aqueous liquid hand dishwashing detergent formulation of the present invention, comprises: (preferably, 0.01 to 35 wt % (more preferably, 0.1 to 20 wt %; still more preferably, 1 to 15 wt %; most preferably, 5 to 12 wt %), based on the weight of the aqueous liquid hand dishwashing detergent formulation, of an anionic surfactant; wherein the anionic surfactant includes (preferably, is) sodium lauryl ether sulfate (SLES).

Preferably, the aqueous liquid hand dishwashing detergent formulation of the present invention, comprises: 0.1 to 10 wt % (preferably, 0.2 to 7.5 wt %; more preferably, 0.4 to 5 wt %; most preferably, 0.5 to 2.5 wt %), based on weight of the aqueous liquid hand dishwashing detergent formulation, of a suds enhancing additive, wherein the suds enhancing additive comprises a polyacrylic acid homopolymer having a molecular weight of 1,000 to 7,500 Daltons (preferably, 1,500 to 6,000 Daltons; more preferably, 4,000 to 5,000 Daltons; most preferably, 4,250 to 4,750 Daltons). More preferably, the aqueous liquid hand dishwashing detergent formulation of the present invention, comprises: 0.1 to 10 wt % (preferably, 0.2 to 7.5 wt %; more preferably, 0.4 to 5 wt %; most preferably, 0.5 to 2.5 wt %), based on weight of the aqueous liquid hand dishwashing detergent formulation, of a suds enhancing additive, wherein the suds enhancing additive is a blend of (i) a polyacrylic acid homopolymer having a molecular weight of 1,000 to 7,500 Daltons (preferably, 1,500 to 6,000 Daltons; more preferably, 4,000 to 5,000 Daltons; most preferably, 4,250 to 4,750 Daltons); and (iii) a sulfonated polymer, wherein the sulfonated polymer has a weight average molecular weight of 1,000 to 25,000 Daltons (preferably, 5,000 to 20,000 Daltons; more preferably, 7,500 to 17,500 Daltons; most preferably, 10,000 to 15,000 Daltons). Still more preferably, the aqueous liquid hand dishwashing detergent formulation of the present invention, comprises: 0.1 to 10 wt % (preferably, 0.2 to 7.5 wt %; more preferably, 0.4 to 5 wt %; most preferably, 0.5 to 2.5 wt %), based on weight of the aqueous liquid hand dishwashing detergent formulation, of a suds enhancing additive, wherein the suds enhancing additive is a blend of (i) a polyacrylic acid homopolymer having a molecular weight of 1,000 to 7,500 Daltons (preferably, 1,500 to 6,000 Daltons; more preferably, 4,000 to 5,000 Daltons; most preferably, 4,250 to 4,750 Daltons); and (ii) a nonionic surfactant. Most preferably, the aqueous liquid hand dishwashing detergent formulation of the present invention, comprises: 0.1 to 10 wt % (preferably, 0.2 to 7.5 wt %; more preferably, 0.4 to 5 wt %; most preferably, 0.5 to 2.5 wt %), based on weight of the aqueous liquid hand dishwashing detergent formulation, of a suds enhancing additive, wherein the suds enhancing additive is a blend of (i) polyacrylic acid homopolymer having a molecular weight of 1,000 to 7,500 Daltons (preferably, 1,500 to 6,000 Daltons; more preferably, 4,000 to 5,000 Daltons; most preferably, 4,250 to 4,750 Daltons); (ii) a nonionic surfactant; and (iii) a sulfonated polymer, wherein the sulfonated polymer has a weight average molecular weight of 1,000 to 25,000 Daltons (preferably, 5,000 to 20,000 Daltons; more preferably, 7,500 to 17,500 Daltons; most preferably, 10,000 to 15,000 Daltons).

Preferably, the polyacrylic acid homopolymer used in the aqueous liquid hand dishwashing detergent formulations of the present invention have a molecular weight of 1,000 to 7,500 Daltons (preferably, ≥1,500 Daltons; more preferably, ≥2,000 Daltons; still more preferably, ≥3,000 Daltons; most preferably, ≥4,000 Daltons; preferably, ≤7,500 Daltons; more preferably, ≤7,000 Daltons; still more preferably, ≤6,000 Daltons; most preferably, ≤5,000 Daltons).

Preferably, the nonionic surfactants used in the aqueous liquid hand dishwashing detergent formulation of the present invention are selected from the group consisting of polyoxyalkylene surfactants, polyalkylene glycol esters, polyoxyethylene derivatives of fatty acid esters of polyhydric alcohols, fatty acid esters of polyalkoxylated polyhydric alcohols, polyalkoxylated natural fats and oils, polyalkylene oxide block copolymers, alkyl polyglucosides, sucrose esters and mixtures thereof. More preferably, the nonionic surfactants used in the aqueous liquid hand dishwashing detergent formulation of the present invention are selected from polyoxyalkylene surfactants. Most preferably, the nonionic surfactants used in the aqueous liquid hand dishwashing detergent formulation of the present invention are selected from polyoxyethylene surfactants. Preferred polyoxyethylene surfactants are selected from the group consisting of alcohol alkoxylates, alkylphenol alkoxylates and mixtures thereof. Preferred alcohol alkoxylates are alcohol alkoxylates, wherein the alkoxylates are selected from the group consisting of ethoxylates, propoxylates and mixtures thereof. More preferred nonionic surfactants include nonionic surfactants selected from the group consisting of alcohol ethoxylate (preferably, a secondary alcohol ethoxylate) that conforms to the formula $$R^2—(OCH_2CH_2)_wOH$$

wherein $R^2$ is a $C_{10-30}$ alkyl group (preferably, a $C_{12-26}$ alkyl group; more preferably, a $C_{12-20}$ alkyl group; most preferably, a $C_{12-18}$ alkyl group); and w has an average value of 5 to 200 (preferably, 5 to 100; more preferably, 5 to 50; most preferably, 5 to 15). Most preferred nonionic surfactant is a branched $C_{12-16}$ alcohol ethoxylate.

Preferably, the sulfonated polymer used in the aqueous liquid hand dishwashing detergent formulation of the present invention is a copolymer of acrylic acid and a sulfonated monomer. More preferably, the sulfonated polymer used in the aqueous liquid hand dishwashing detergent formulation of the present invention is a copolymer of acrylic acid and a sulfonated monomer; wherein the sulfonated monomer is selected from the group consisting of 2-acrylamido-2-methylpropane sulfonic acid (AMPS), 2-methacrylamido-2-methylpropane sulfonic acid, 4-styrenesulfonic acid, vinylsulfonic acid, 3-allyloxy sulfonic acid, 2-hydroxy-1-propane sulfonic acid (HAPS), 2-sulfoethyl(meth)acrylic acid, 2-sulfopropyl(meth)acrylic acid, 3-sulfopropyl(meth)acrylic acid, 4-sulfobutyl(meth)acrylic acid and salts thereof. Most preferably, the sulfonated polymer used in the aqueous liquid hand dishwashing detergent formulation of the present invention is a copolymer of acrylic acid and a sulfonated monomer; wherein the sulfonated monomer is selected from the group consisting of 2-acrylamido-2-methylpropane sulfonic acid (AMPS) and salts thereof.

Preferably, the sulfonated polymer used in the aqueous liquid hand dishwashing detergent formulation of the present invention, comprises: 50 to 95 wt % (preferably, 60 to 94 wt %; more preferably, 65 to 93 wt %; most preferably, 68 to 90 wt %), based on weight of the sulfonated polymer, of structural units of acrylic acid; and 5 to 50 wt % (preferably, 6 to 40 wt %; more preferably, 7 to 35 wt %; most preferably, 10 to 32 wt %), based on weight of the sulfonated polymer, of structural units of sulfonated monomer. More preferably, the sulfonated polymer used in the aqueous liquid hand dishwashing detergent formulation of the present invention, comprises: 50 to 95 wt % (preferably, 60 to 94 wt %; more preferably, 65 to 93 wt %; most preferably, 68 to 90 wt %), based on weight of the sulfonated polymer, of structural units of acrylic acid; and 5 to 50 wt % (preferably, 6 to 40 wt %; more preferably, 7 to 35 wt %; most preferably, 10 to 32 wt %), based on weight of the sulfonated polymer, of structural units of sulfonated monomer; wherein the sulfonated monomer is wherein the sulfonated monomer is selected from the group consisting of 2-acrylamido-2-methylpropane sulfonic acid (AMPS), 2-methacrylamido-2-methylpropane sulfonic acid, 4-styrenesulfonic acid, vinylsulfonic acid, 3-allyloxy sulfonic acid, 2-hydroxy-1-propane sulfonic acid (HAPS), 2-sulfoethyl(meth)acrylic acid, 2-sulfopropyl(meth)acrylic acid, 3-sulfopropyl(meth)acrylic acid, 4-sulfobutyl(meth)acrylic acid and salts thereof. Most preferably, the sulfonated polymer used in the aqueous liquid hand dishwashing detergent formulation of the present invention, comprises: 50 to 95 wt % (preferably, 60 to 94 wt %; more preferably, 65 to 93 wt %; most preferably, 68 to 90 wt %), based on weight of the sulfonated polymer, of structural units of acrylic acid; and 5 to 50 wt % (preferably, 6 to 40 wt %; more preferably, 7 to 35 wt %; most preferably, 10 to 32 wt %), based on weight of the sulfonated polymer, of structural units of sulfonated monomer; wherein the sulfonated monomer is selected from the group consisting of 2-acrylamido-2-methylpropane sulfonic acid (AMPS) and salts thereof.

Preferably, the sulfonated polymer used in the aqueous liquid hand dishwashing detergent formulation of the present invention has a weight average molecular weight, $M_W$, of 1,000 to 25,000 Daltons (preferably, 5,000 to 20,000 Daltons; more preferably, 7,500 to 17,500 Daltons; most preferably, 10,000 to 15,000 Daltons).

Preferably, the aqueous liquid hand dishwashing detergent formulation of the present invention, optionally further comprises a cellulose polymer. More preferably, the aqueous liquid hand dishwashing detergent formulation of the present invention, further comprises 0.05 to 10 wt % (preferably, 0.1 to 5 wt %; more preferably, 0.25 to 1 wt %), based on weight of the aqueous liquid hand dishwashing detergent formulation, of a cellulose polymer. Most preferably, the aqueous liquid hand dishwashing detergent formulation of the present invention, further comprises 0.05 to 10 wt % (preferably, 0.1 to 5 wt %; more preferably, 0.25 to 1 wt %), based on weight of the aqueous liquid hand dishwashing detergent formulation, of a cellulose polymer; wherein the cellulose polymer has a 1% Brookfield viscosity of 4,400 to 6,000 cP.

Preferably, the cellulose polymer used in the aqueous liquid hand dishwashing detergent formulation of the present invention has a weight average molecular weight, $M_W$, of >200,000 Daltons (preferable, >500,000 to 3,000,000 Daltons; more preferably, 600,000 to 2,500,000 Daltons; still more preferably, >800,000 to 2,250,000 Daltons; most preferably, 900,000 to 2,000,000 Daltons). More preferably, the cellulose polymer used in the aqueous liquid hand dishwashing detergent formulation of the present invention has a weight average molecular weight, $M_W$, of >200,000 Daltons (preferable, >500,000 to 3,000,000 Daltons; more preferably, 600,000 to 2,500,000 Daltons; still more preferably, >800,000 to 2,250,000 Daltons; most preferably, 900,000 to 2,000,000 Daltons); wherein the cellulose polymer is selected from the group consisting of hydroxyethyl cellulose polymer, hydroxypropyl cellulose polymer, ethyl hydroxyethyl cellulose polymer, methyl cellulose polymer, hydroxypropyl methyl cellulose polymer, hydroxyethyl methyl cellulose polymer and mixtures thereof. Still more preferably, the cellulose polymer used in the aqueous liquid hand dishwashing detergent formulation of the present invention has a weight average molecular weight, $M_W$, of >200,000 Daltons (preferable, >500,000 to 3,000,000 Daltons; more preferably, 600,000 to 2,500,000 Daltons; still more preferably, >800,000 to 2,250,000 Daltons; most preferably, 900,000 to 2,000,000 Daltons); wherein the cellulose polymer is selected from the group consisting of hydroxyethyl cellulose polymer, hydroxypropyl cellulose polymer and mixtures thereof. Most preferably, the cellulose polymer used in the aqueous liquid hand dishwashing detergent formulation of the present invention has a weight average molecular weight, $M_W$, of >200,000 Daltons (preferable, >500,000 to 3,000,000 Daltons; more preferably, 600,000 to 2,500,000 Daltons; still more preferably, >800,000 to 2,250,000 Daltons; most preferably, 900,000 to 2,000,000 Daltons); wherein the cellulose polymer is hydroxyethyl cellulose polymer.

Preferably, the aqueous liquid hand dishwashing detergent formulation of the present invention, optionally further comprises a poly(ethylene oxide) polymer. More preferably, the aqueous liquid hand dishwashing detergent formulation of the present invention, further comprises 0.005 to 0.5 wt % (preferably, 0.0075 to 0.05 wt %; more preferably, 0.009 to 0.02 wt %), based on weight of the aqueous liquid hand dishwashing detergent formulation, of the poly(ethylene oxide) polymer. Most preferably, the aqueous liquid hand dishwashing detergent formulation of the present invention, further comprises 0.005 to 0.5 wt % (preferably, 0.0075 to 0.05 wt %; more preferably, 0.009 to 0.02 wt %), based on weight of the aqueous liquid hand dishwashing detergent formulation, of the poly(ethylene oxide) polymer; wherein the poly(ethylene oxide) polymer has a weight average molecular weight, $M_W$, of 750,000 to 10,000,000 Daltons (preferably, ≥1,000,000 Daltons; more preferably, ≥2,000,000 Daltons; still more preferably, ≥4,000,000 Daltons; preferably, ≤8,000,000 Daltons; more preferably, ≤7,000,000 Daltons; most preferably, ≤6,000,000 Daltons).

Preferably, the aqueous liquid hand dishwashing detergent formulation of the present invention, optionally further comprises an amphoteric surfactant. More preferably, the aqueous liquid hand dishwashing detergent formulation of the present invention, optionally comprises 0.01 to 5 wt % (preferably, 0.1 to 2 wt %; more preferably, 0.5 to 0.7 wt %), based on weight of the aqueous liquid hand dishwashing detergent formulation, of an amphoteric surfactant. Still more preferably, the aqueous liquid hand dishwashing detergent formulation of the present invention, optionally comprises 0.01 to 5 wt % (preferably, 0.1 to 2 wt %; more preferably, 0.5 to 0.7 wt %), based on weight of the aqueous liquid hand dishwashing detergent formulation, of an amphoteric surfactant; wherein the amphoteric surfactant is selected from the group consisting of betaines, amine oxides, alkylamidoalkylamines, alkyl-substituted amine oxides, acylated amino acids, derivatives of aliphatic quaternary ammonium compounds and mixtures thereof. Yet more preferably, the aqueous liquid hand dishwashing detergent formulation of the present invention, optionally comprises 0.01 to 5 wt % (preferably, 0.1 to 2 wt %; more preferably, 0.5 to 0.7 wt %), based on weight of the aqueous liquid hand dishwashing detergent formulation, of an amphoteric surfactant; wherein the amphoteric surfactant includes a betaine. Most preferably, the aqueous liquid hand dishwashing detergent formulation of the present invention, optionally comprises 0.01 to 5 wt % (preferably, 0.1 to 2 wt %; more preferably, 0.5 to 0.7 wt %), based on weight of the aqueous liquid hand dishwashing detergent formulation, of an amphoteric surfactant; wherein the amphoteric surfactant is a cocamidopropyl betaine.

Preferably, the aqueous liquid hand dishwashing detergent formulation of the present invention, further comprises an optional ingredient. Preferably, the aqueous liquid hand dishwashing detergent formulation of the present invention, further comprises an optional ingredient; wherein the optional ingredient is selected from the group consisting of a salt, a builder, an enzyme, a corrosion inhibitor, an acid, a bleaching agent, an abrasive, an antimicrobial agent (e.g., phenoxyethanol), a chelating agent, an additional surfactant, a pH adjuster, a buffering agent, a dye, a fragrance, a hydrotrope, an organic solvent, a rheology modified and mixtures thereof.

Preferably, the aqueous liquid hand dishwashing detergent formulation of the present invention, optionally further comprises: 0 to 10 wt % (preferably, 0.1 to 10 wt %; more preferably, 0.5 to 7.5 wt %; most preferably, 1 to 5 wt %), based on weight of the aqueous liquid hand dishwashing detergent formulation, of a hydrotrope. More preferably, the aqueous liquid hand dishwashing detergent formulation of the present invention, optionally further comprises: 0 to 10 wt % (preferably, 0.1 to 10 wt %; more preferably, 0.5 to 7.5 wt %; most preferably, 1 to 5 wt %), based on weight of the aqueous liquid hand dishwashing detergent formulation, of a hydrotrope; wherein the hydrotrope is selected from the group consisting of urea; monoethanolamine; diethanolamine; triethanolamine; and calcium, sodium, potassium, ammonium and alkanol ammonium salts of xylene sulfonic acid, toluene sulfonic acid, ethylbenzene sulfonic acid and cumene sulfonic acid; and mixtures thereof. Most preferably, the aqueous liquid hand dishwashing detergent formulation of the present invention, further comprises: 0 to 10 wt % (preferably, 0.1 to 10 wt %; more preferably, 0.5 to 7.5 wt %; most preferably, 1 to 5 wt %), based on weight of the aqueous liquid hand dishwashing detergent formulation, of a hydrotrope; wherein the hydrotrope is selected from the group consisting of sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof.

Preferably, the aqueous liquid hand dishwashing detergent formulation of the present invention, optionally further comprises: 0 to 10 wt % (preferably, 0.01 to 10 wt %; more preferably, 1 to 7.5 wt %; most preferably, 1.5 to 5 wt %), based on the weight of the aqueous liquid hand dishwashing detergent formulation, of an organic solvent. More preferably, the aqueous liquid hand dishwashing detergent formulation of the present invention, optionally further comprises: 0 to 10 wt % (preferably, 0.01 to 10 wt %; more preferably, 1 to 7.5 wt %; most preferably, 1.5 to 5 wt %), based on the weight of the aqueous liquid hand dishwashing detergent formulation, of an organic solvent; wherein the organic solvent is miscible with water. Most preferably, the aqueous liquid hand dishwashing detergent formulation of the present invention, optionally further comprises: 0 to 10 wt % (preferably, 0.01 to 10 wt %; more preferably, 1 to 7.5 wt %; most preferably, 1.5 to 5 wt %), based on the weight of the aqueous liquid hand dishwashing detergent formulation, of an organic solvent; wherein the organic solvent is selected from the group consisting of an aliphatic alcohol (e.g., $C_{1-6}$ alkanols, $C_{1-6}$ alkyl diols); a monoalkylene glycol ether (e.g., ethylene glycol propyl ether, ethylene glycol n-butyl ether, ethylene glycol t-butyl ether, propylene glycol propyl ether, propylene glycol n-butyl ether, propylene glycol t-butyl ether, propylene glycol methyl ether acetate, propylene glycol diacetate); a polyalkylene glycol ether (e.g., diethylene glycol ethyl ether, diethylene glycol propyl ether, diethylene glycol n-butyl ether, diethylene glycol t-butyl ether, diethylene glycol hexyl ether, dipropylene glycol methyl ether, dipropylene glycol ethyl ether, dipropylene glycol propyl ether, dipropylene glycol n-butyl ether, dipropylene glycol t-butyl ether, dipropylene glycol phenyl ether, dipropylene glycol methyl ether acetate, tripropylene glycol methyl ether, tripropylene glycol ethyl ether, tripropylene glycol propyl ether, tripropylene glycol n-butyl ether, tripropylene glycol t-butyl ether) and mixtures thereof.

Preferably, the aqueous liquid hand dishwashing detergent formulation of the present invention contains <0.1 wt % (preferably, <0.01 wt %; more preferably, <0.001 wt %; still more preferably, <0.0001 wt %; most preferably, less than the detectable limit) of nitrogen containing polycarboxylates. As used herein and in the appended claims the term "polycarboxylate" as used herein and in the appended claims refers to a molecule containing at least three carboxyl groups.

Preferably, the aqueous liquid hand dishwashing detergent formulation of the present invention contains <0.1 wt % (preferably, <0.01 wt %; more preferably, <0.001 wt %; still more preferably, <0.0001 wt %; most preferably, less than the detectable limit) of amphiphilic polymers.

Preferably, the aqueous liquid hand dishwashing detergent formulation of the present invention contains <0.1 wt % (preferably, <0.01 wt %; more preferably, <0.001 wt %; still more preferably, <0.0001 wt %; most preferably, less than the detectable limit) of zwitterionic polymers.

Preferably, the method of making an aqueous liquid hand dishwashing detergent formulation, of the present invention, comprises: (a) providing water; (b) providing an anionic surfactant; (c) selecting a suds enhancing additive, wherein the suds enhancing additive is selected to include a polyacrylic acid homopolymer (preferably, 0.1 to 10 wt %; more preferably, 0.2 to 7.5 wt %; still more preferably, 0.4 to 5 wt %; most preferably, 0.5 to 2.5 wt %), based on weight of the aqueous liquid hand dishwashing detergent formulation, of the sud enhancing additive), wherein the polyacrylic acid homopolymer has a molecular weight of 1,000 to 7,500 Daltons (preferably, 1,500 to 6,000 Daltons; more preferably, 4,000 to 5,000 Daltons; most preferably, 4,250 to 4,750 Daltons); (d) providing the suds enhancing additive; (e) combining the water, the anionic surfactant and the suds enhancing additive to form an aqueous liquid hand dishwashing detergent formulation; wherein the concentration of anionic surfactant required to achieve a given suds mileage performance is reduced by at least 30% (preferably, at least 40; more preferably, at least 50%) through the incorporation of the suds enhancing agent (i.e., wherein the aqueous liquid hand dishwashing formulation of the invention exhibits a suds mileage performance that is≥the suds mileage performance of an otherwise equivalent formulation but having twice the concentration of anionic surfactant and excluding the suds enhancing additive, wherein the suds mileage performance is determined using the IKW methodology described in Nitsch & Huttman, *Recommendation for the Quality Assessment of the Cleaning Performance of Hand Dishwashing Detergents,* SOFW Journal; vol. 128, pp. 23-29 (2002)(ISSN 0942-7694).

Preferably, the method of manually washing an article of the present invention, comprises: providing an article, wherein the article is selected from the group consisting of at least one of dishware, glassware, flatware, pots and pans (preferably, wherein the article is selected from the group consisting of at least one of dishware, glassware and flatware; preferably, wherein the article is soiled with a greasy food soil); providing an aqueous liquid hand dishwashing detergent formulation of the present invention; manually contacting the article with the aqueous liquid hand dishwashing detergent formulation; and rinsing the aqueous liquid hand dishwashing detergent formulation from the article.

Some embodiments of the present invention will now be described in detail in the following Examples.

Comparative Examples C1-C4 and Examples 1-5

Aqueous Liquid Hand Dishwashing Detergent Formulations

Aqueous liquid hand dishwashing detergent formulations of Comparative Examples C1-C4 and Examples 1-5 were prepared by mixing together the components in the weight proportions noted in TABLE 1 adjusted to pH 6 (as necessary) with sodium hydroxide. The aqueous liquid hand dishwashing detergent formulations of Comparative Examples C1-C4 and Examples 1-5 were observed for cleaning performance in hand dishwashing according to the IKW methodology described in Nitsch & Huttman, *Recommendation for the Quality Assessment of the Cleaning Performance of Hand Dishwashing Detergents*, SOFW Journal; vol. 128, pp. 23-29 (2002)(ISSN 0942-7694). The cleaning performance results are reported Table 2.

TABLE 1

| | Material | | | | | | | | | | | | | |
|---|---|---|---|---|---|---|---|---|---|---|---|---|---|---|
| Ex. | A (wt %) | B (wt %) | C (wt %) | D (wt %) | E (wt %) | F (wt %) | G (wt %) | H (wt %) | I (wt %) | J (wt %) | K (wt %) | L (wt %) | M (wt %) | N (wt %) |
| C1 | 66.58 | 0.5 | 0.02 | 27.0 | 4.0 | 0 | 0 | 0 | 0 | 0 | 0.5 | 0.1 | 1 | 0.3 |
| C2 | 80.99 | 0.5 | 0.01 | 13.1 | 2.0 | 0 | 1.5 | 0 | 0 | 0 | 0.5 | 0.1 | 1 | 0.3 |
| C3 | 81.74 | 0.5 | 0.01 | 13.1 | 2.0 | 0.75 | 0 | 0 | 0 | 0 | 0.5 | 0.1 | I | 0.3 |
| C4 | 80.74 | 0.5 | 0.01 | 13.1 | 2.0 | 0.75 | 0 | 0 | 0 | 1 | 0.5 | 0.1 | 1 | 0.3 |
| 1 | 80.99 | 0.5 | 0.01 | 13.1 | 2.0 | 0 | 0 | 1.5 | 0 | 0 | 0.5 | 0.1 | 1 | 0.3 |
| 2 | 79.49 | 0.5 | 0.01 | 13.1 | 2.0 | 0 | 1.5 | 1.5 | 0 | 0 | 0.5 | 0.1 | 1 | 0.3 |
| 3 | 79.49 | 0.5 | 0.01 | 13.1 | 2.0 | 0 | 1.5 | 0 | 1.5 | 0 | 0.5 | 0.1 | 1 | 0.3 |
| 4 | 78.24 | 0.5 | 0.01 | 13.1 | 2.0 | 0.75 | 1.5 | 1.5 | 0 | 0 | 0.5 | 0.1 | 1 | 0.3 |
| 5 | 78.74 | 0.5 | 0.01 | 13.1 | 2.0 | 0.75 | 1.5 | 0 | 1.5 | 0 | 0.5 | 0.1 | 1 | 0.3 |

A—Deionized water
B—CELLOSIZE QP 100 MH hydroxyethyl cellulose polymer available from The Dow Chemical Company
C—SupraCare 430 poly(ethylene oxide) polymer available from The Dow Chemical Company
D—Texapon N70 sodium Laureth Sulphate (SLES) (70 wt % in water) available from BASF
E—Empigen BS/FA cocamidopropyl betaine (30 wt % in water) available from Huntsman
F—TERGITOL 15-S-9 secondary alcohol ethoxylate nonionic surfactant available from The Dow Chemical Company
G—ACUSOL 588 copolymer of acrylic and sulphonic acids (38 wt % in water), $M_w$ of ~12,000 Daltons available from The Dow Chemical Company
H—ACUSOL 445 polyacrylic acid homopolymer (48 wt % in water), $M_w$ of ~4,500 Daltons available from The Dow Chemical Company
I—ACUSOL 420N polyacrylic acid homopolymer (48 wt % in water), $M_w$ of ~1,800 Daltons available from The Dow Chemical Company
J—ACUSOL 479N acrylic/maleic copolymer (40 wt % in water), $M_w$ of ~70,000 available from The Dow Chemical Company
K—Phenoxyethanol available from DuPont
L—Unicert Blue 0560IJ (0.1 wt % in water) available from Sensient
M—Unicert Yellow 8005 (0.1 wt % in water) available from Sensient
N—Lemon & Basil 814 fragrance available from IFF

TABLE 2

| Aqueous liquid hand dishwashing detergent formulation | Yield/Foam Mileage |
|---|---|
| Comparative Example C1 | 7 |
| Comparative Example C2 | 6 |
| Comparative Example C3 | 7 |
| Comparative Example C4 | 6 |
| Example 1 | 8 |
| Example 2 | 8 |
| Example 3 | 8 |
| Example 4 | 12 |
| Example 5 | 11 |

We claim:

1. Aqueous liquid hand dishwashing detergent formulation, comprising:

water;

an anionic surfactant;

a suds enhancing additive, wherein the suds enhancing additive comprises (i) a polyacrylic acid homopolymer having a weight average molecular weight, $M_w$, of 1,000 to 7,500 Daltons; (ii) a nonionic surfactant; and (iii) a sulfonated polymer, wherein the sulfonated polymer has a weight average molecular weight of 1,000 to 25,000 Daltons;

a cellulose polymer; and a poly(ethylene oxide) polymer, wherein the poly(ethylene oxide) polymer has a weight average molecular weight, $M_W$, of 750,000 to 10,000,000 Daltons.

2. The aqueous liquid hand dishwashing detergent formulation of claim 1, wherein the anionic surfactant is a sodium lauryl ether sulfate.

3. The aqueous liquid hand dishwashing detergent formulation of claim 2, further comprising an amphoteric surfactant.

4. The aqueous liquid hand dishwashing detergent formulation of claim 1, further comprising an optional ingredient selected from the group consisting of a salt, a builder, an enzyme, a corrosion inhibitor, an acid, a bleaching agent, an abrasive, an antimicrobial agent, a chelating agent, an additional surfactant, a pH adjuster, a buffering agent, a dye, a fragrance, a hydrotrope, an organic solvent, rheology modifier and mixtures thereof.

5. A method of manually washing an article, comprising:

providing an article, wherein the article is selected from the group consisting of at least one of dishware, glassware, flatware, pots and pans;

providing an aqueous liquid hand dishwashing detergent formulation of claim 1;

manually contacting the article with the aqueous liquid hand dishwashing detergent formulation; and rinsing the aqueous liquid hand dishwashing detergent formulation from the article.

6. The aqueous liquid hand dishwashing detergent formulation of claim 1, comprising:

10 to 99 wt %, based on weight of the aqueous liquid hand dishwashing detergent formulation, of water;

0.01 to 35 wt %, based on weight of the aqueous liquid hand dishwashing detergent formulation, of the anionic surfactant;

0.1 to 10 wt %, based on weight of the aqueous liquid hand dishwashing detergent formulation, of the suds enhancing additive;

0.05 to 10 wt %, based on weight of the aqueous liquid hand dishwashing detergent formulation, of the cellulose polymer; and 0.005 to 0.5 wt %, based on weight of the aqueous liquid hand dishwashing detergent formulation, of the poly (ethylene oxide) polymer.

7. The aqueous liquid hand dishwashing detergent formulation of claim 6, comprising: 0.009 to 0.02 wt %, based on weight of the aqueous liquid hand dishwashing detergent formulation, of the poly(ethylene oxide) polymer.

8. The aqueous liquid hand dishwashing detergent formulation of claim 7, wherein the poly(ethylene oxide) polymer has a weight average molecular weight, $M_w$, of 4,000,000 to 8,000,000 Daltons.

9. The aqueous liquid hand dishwashing detergent formulation of claim 8, wherein the cellulose polymer is a hydroxyethyl cellulose polymer.

10. The aqueous liquid hand dishwashing detergent formulation of claim 9, wherein the hydroxyethyl cellulose polymer has a weight average molecular weight, $M_w$, of >500,000 to 3,000,000 Daltons.

11. The aqueous liquid hand dishwashing detergent formulation of claim 10, comprising 0.25 to 1 wt %, of the hydroxyethyl cellulose polymer.

12. The aqueous liquid hand dishwashing detergent formulation of claim 11, comprising 5 to 12 wt %, based on weight of the aqueous liquid hand dishwashing detergent formulation, of the anionic surfactant; wherein the anionic surfactant comprises sodium lauryl ether sulfate.

13. The aqueous liquid hand dishwashing detergent formulation of claim 12, wherein the nonionic surfactant is an alcohol ethoxylate that conforms to formula $$R^2—(OCH_2CH_2)_wOH$$

wherein $R^2$ is a $C_{12-18}$ alkyl group and w has an average value of 5 to 15.

14. The aqueous liquid hand dishwashing detergent formulation of claim 13, wherein the sulfonated polymer is a copolymer of acrylic acid and a sulfonated monomer.

15. The aqueous liquid hand dishwashing detergent formulation of claim 14, wherein the sulfonated monomer is selected from the group consisting of 2-acrylamido-2-methylpropane sulfonic acid and salts thereof.

16. A method of manually washing an article, comprising:

providing an article, wherein the article is selected from the group consisting of at least one of dishware, glassware, flatware, pots and pans;

providing an aqueous liquid hand dishwashing detergent formulation of claim 15;

manually contacting the article with the aqueous liquid hand dishwashing detergent formulation; and rinsing the aqueous liquid hand dishwashing detergent formulation from the article.

* * * * *